United States Patent [19]

Witte

[11] 4,164,364
[45] Aug. 14, 1979

[54] INPUT/OUTPUT COUPLER FOR MULTI-MODE OPTICAL FIBERS

[75] Inventor: Hans H. Witte, Munich, Fed. Rep. of Germany

[73] Assignee: Siemens Aktiengesellschaft, Berlin & Munich, Fed. Rep. of Germany

[21] Appl. No.: 804,398

[22] Filed: Jun. 7, 1977

[30] Foreign Application Priority Data

Jun. 9, 1976 [DE] Fed. Rep. of Germany ....... 2625855

[51] Int. Cl.² .............................................. G02B 5/14
[52] U.S. Cl. .............................. 350/96.17; 350/96.15
[58] Field of Search ............... 350/96.15, 96.16, 96.17, 350/96.20, 96.12

[56] References Cited

U.S. PATENT DOCUMENTS

| 3,902,786 | 9/1975 | Brown | 350/96.16 |
| 4,008,061 | 2/1977 | Ramsay | 350/96.15 |

FOREIGN PATENT DOCUMENTS 2408623  9/1975  Fed. Rep. of Germany ........ 350/96.21

OTHER PUBLICATIONS

S. Sheem and J. R. Whinnery, "Guiding by Single Curved Bounderies in Integrated Optics", Wave Electronics, vol. 1, No. 1, 1974, pp. 61–68.

Primary Examiner—Rolf G. Hille
Attorney, Agent, or Firm—Hill, Van Santen, Steadman, Chiara & Simpson

[57] ABSTRACT

An input/output coupler for multi-mode optical or light conducting fibers comprises a substrate, a first light conductor, which is disposed on the substrate and has an end face forming a coupling point or surface, a main light conducting fiber, which is disposed on the substrate with an end face at the coupling surface and a center of the end face offset by a distance a from the center of the coupling surface, and a strip waveguide, which is coupled to a branch light conducting fiber and is disposed on the substrate with an end face in contact with a portion of the coupling surface so that a portion of a light signal entering the coupler in the first light conductor is applied to both the main and branch light conducting fibers and signals entering the coupler in the branch and main light conducting fibers are applied to the first light conductor. The first light conductor may be either a light conducting fiber or an additional strip waveguide, which is coupled to a light conducting fiber. Preferably, the substrate has guide grooves formed in a layer of material for positioning the various light conducting fibers and the material of the layer is the same as the material used to form the strip waveguide.

10 Claims, 6 Drawing Figures

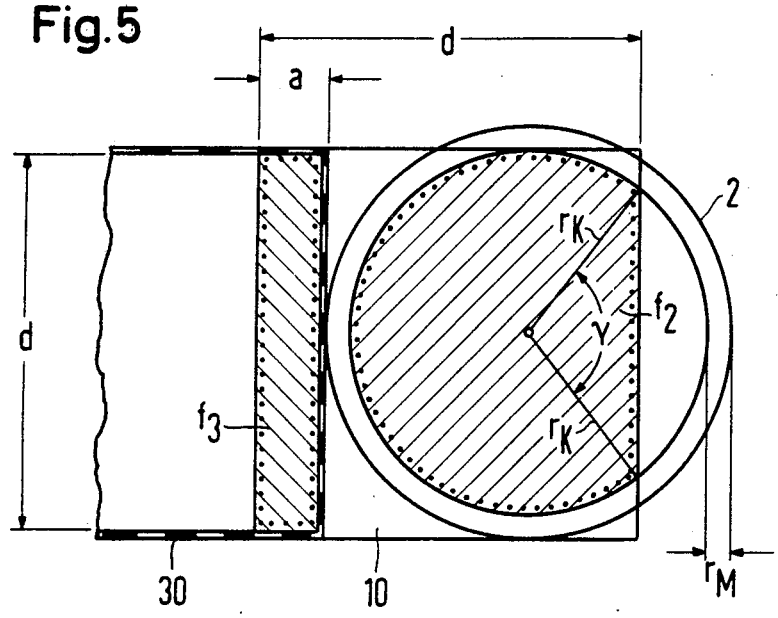
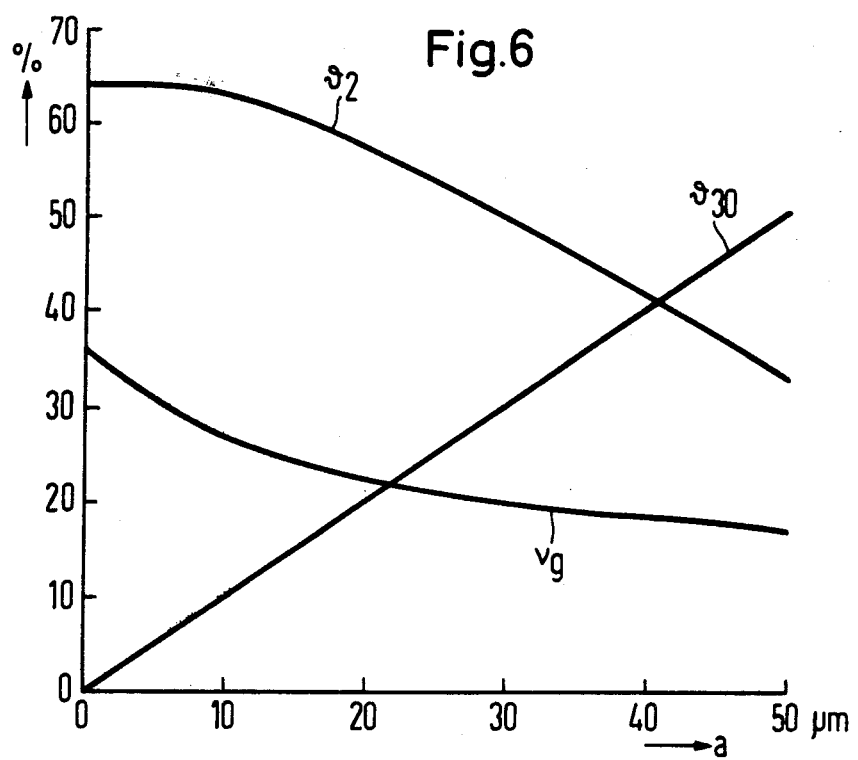

INPUT/OUTPUT COUPLER FOR MULTI-MODE OPTICAL FIBERS

BACKGROUND OF THE INVENTION

1. Field of the Invention

The present invention is directed to an output or input coupler for multi-mode optical fibers such as light conducting glass fibers.

2. Prior Art

In optical transmission systems, it is often necessary to draw or decouple part of the optical energy or power from a light conducting fiber at a specific point or to additionally input couple optical power or energy into the optical fiber system. The output coupling of a part of the optical part of the system enables supplying an optical unit with a signal or to measure a signal level in the optical system. The input coupling enables an optical unit to feed an optical signal into the transmission lines of the optical system.

Output and input couplers for groups of glass fibers or glass fiber bundles are already known. Examples of these couplers are described in the following two publications: F. L. Thiel, "Topical Meeting On Optical Fiber Transmission", Jan. 7–9, 1975, Williamsburg, Va., U.S.A., Paper WE 1—1, and A. F. Milton, A. B. Lee, "Topical Meeting On Optical Fiber Transmission", Jan. 7-9, 1975, Williamsburg, Va., U.S.A., Paper WE 2-1.

Another known type of glass fiber branch arrangement is a branching fiber core, which is arranged within a common fiber cladding. This known branching arrangement could also be used as an output and input coupler. This known branch arrangement is produced by providing a profile having a branch core, and then drawing the profile to form the appropriate branched glass fibers. However, the production process to produce this type of branch glass fiber is relatively expensive.

SUMMARY OF THE INVENTION

The present invention is directed to providing an output and/or input coupler which is simple to produce. The accomplish these tasks, a coupler for use with multi-mode light conducting or optical fibers to couple-out and couple-in a light signal to the fibers comprises a substrate, a first light conductor being disposed on the substrate and having an end face forming a coupling surface, a main light conducting fiber being disposed on the substrate with an end face at the coupling surface and the center of the end face being offset by a distance a from the center of the coupling surface of the first light conductor, a strip waveguide being disposed on the substrate and having an end face in contact with a portion of the coupling surface of the first light conductor, said strip waveguide extending to a branch light conducting fiber so that a portion of a signal entering the coupler in the first light conductor is applied to both the main and branch light conducting fibers and signals entering the coupler in the branch and main light conducting fibers are applied to the first light conductor. The first light conductor may be either a light conducting fiber or may be an additional strip waveguide which is coupled to a light conducting fiber and extends to the coupling surface. Preferably, the substrate is provided with guide means comprising grooves or trenches formed in a layer of material which is of the same material that forms the strip waveguides.

An advantage of the couplers according to the present invention is that both the strip waveguides and the grooves or trenches forming the guide means for the light conducting fibers can be made in a single photolithographic process by applying a layer of photosensitive material on a substrate, providing a mask corresponding to the shape of the various strip waveguides and the portions forming the guide grooves or trenches, exposing the photosensitive layer and developing it to produce the guide grooves and trenches as well as the strip waveguides.

Another advantage is that the values of the coupling efficiency can be calculated very easily and reproduced with great accuracy during production of the couplers.

In the case of couplers in accordance with the present invention, the first light conductor is disposed at the coupling point or surface with the center of its end face being offset relative to the center of the end face of the main light conducting fiber. A part of the end face of the first light conductor which is not covered by the end face of the main or continuing light conducting fiber at the coupling point or surface is connected with an end of an input or output branch line which is constructed as a strip or lamellar waveguide which extends or leads to a branch light conducting fiber. The fraction of the light energy fed in or fed out is precisely fixed by virtue of the amount of the end face of the first light conductor which is in alignment with each of the main light conducting fibers and the strip waveguide and is therefore proportional to the amount of offset of the center of the main light conducting fiber to the first light conductor.

BRIEF DESCRIPTION OF THE DRAWINGS

FIG. 5 is a schematic end view taken at the coupling point of the embodiment of FIG. 4; and FIG. 6 is a graph showing the proportions and loss in relation to the amount of offset of the embodiment of FIG. 4.

DESCRIPTION OF THE PREFERRED EMBODIMENTS

Figure 1:
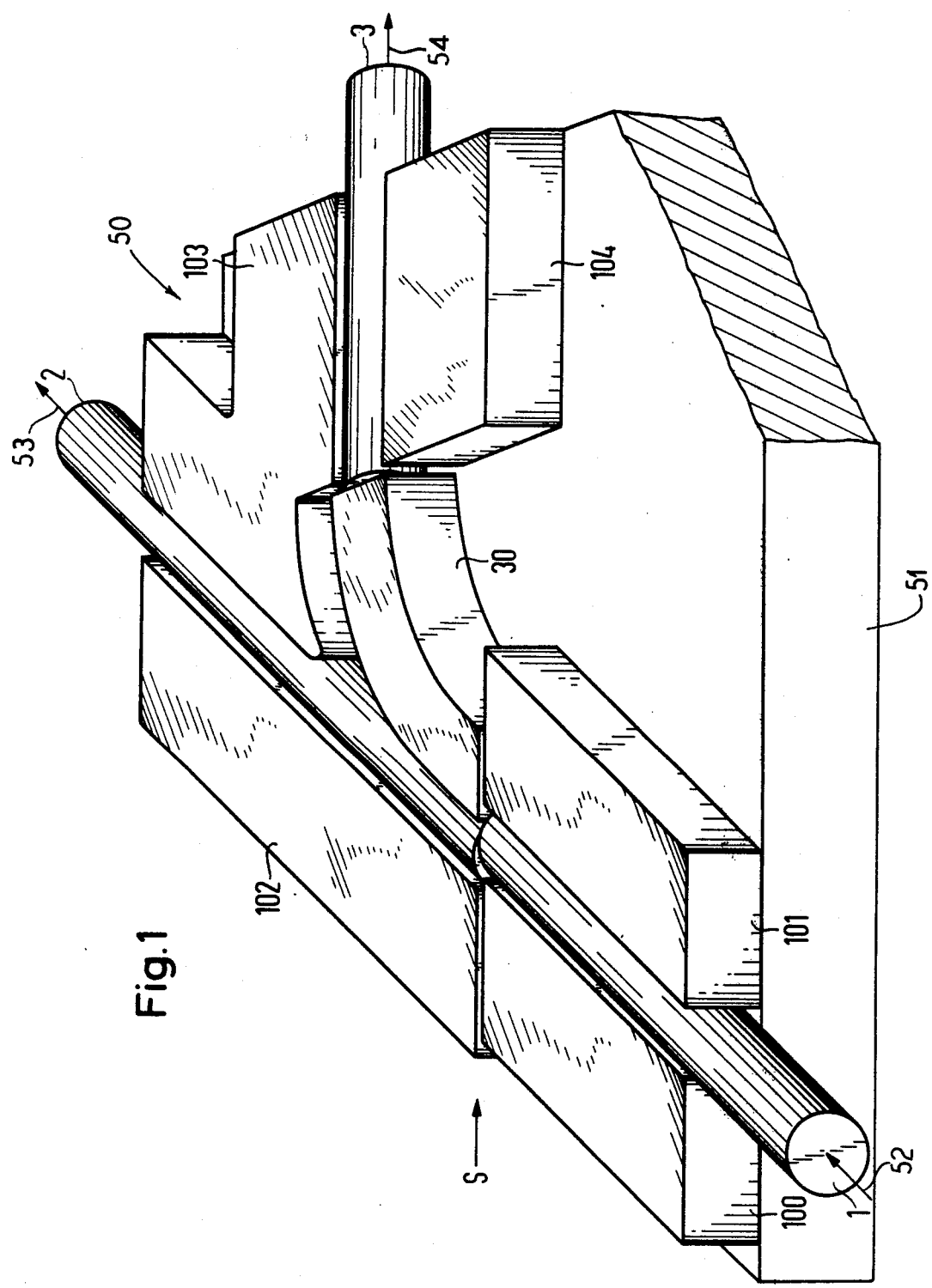
FIG. 1 is a perspective view with portions broken away for purposes of illustration of a coupler in accordance with the present invention.

The principles of the present invention are particularly useful when incorporated in a coupler generally indicated at 50 in FIG. 1.

The coupler 50 comprises a substrate 51, which has means comprising guide pieces or members 100–104, which form guide trenches or grooves for receiving and positioning light conducting fibers 1, 2 and 3. In addition, the substrate is provided with a strip or lamellar waveguide 30. As illustrated, a first light conductor or optical fiber 1 is received in the guide groove or trench formed by members 100 and 101. A main or continuing optical fiber such as the optical fiber 2 is positioned by members 102 and 103 with its optical axis offset from the first fiber 1 so that the center of its end face is offset from the center of the end face of the fiber 1 at a coupling point S. The lamellar or strip waveguide 30 has an end face which is also positioned at the coupling point S and overlies a portion of the end face of the fiber 1 and extends in a curved path to be coupled to a branch optical fiber 3.

If the coupler 50 is used as an output coupler, light will propagate in the fibers 1, 2 and 3 as indicated by arrows 52, 53 and 54. At a coupling point S, the light carried by the first optical fiber 1 has a portion fed into the second optical fiber 2 and a second portion fed into the strip waveguide 30 which second portion will be carried away from the coupling point S and be coupled into the optical fiber 3.

Figure 2:
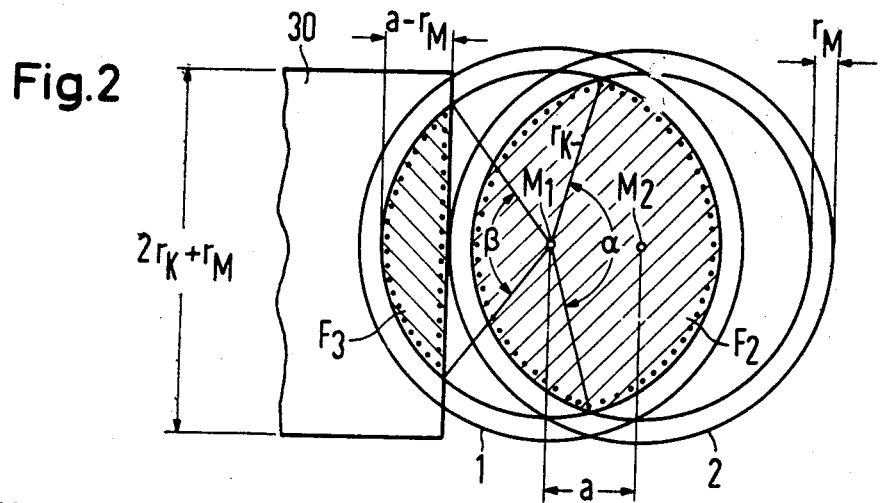
FIG. 2 is a schematic end view taken at the coupling point illustrating the overlapping relationship of the coupler of the present invention.

The coupling efficiency values will now be explained with reference to FIG. 2. Both the first light conductor or optical fiber 1 and the main or second optical fiber 2 have a core with a radius $r_K$, which core is cladded with a cladding or sheath of a thickness $r_M$. The center $M_1$ of the first fiber 1 is offset from the center of the fiber center $M_2$ of the fiber 2 by a distance a. Due to the offset of a distance a, the end faces of the cores of the two fibers 1 and 2 overlap in an area $F_2$. The end face of the core of the first fiber or conductor 1 overlaps the end face of the strip waveguide 30 over an area of $F_3$.

The proportions of the light energy passed over and into the individual fibers are fixed by the sizes of the areas $F_2$ and $F_3$. The size of these areas are determined by the following two equations:

$$F_2 = \left(\frac{\pi a}{180} - \sin \alpha\right) r_K^2$$

wherein $\alpha = 2 \arccos \frac{a}{2 r_K}$;

$$F_3 = \left(\frac{\pi \beta}{180} - \sin \beta\right) \frac{r_K^2}{2}$$

wherein $\beta = 2 \arccos \frac{r_K - (a - r_M)}{r_K}$

If the light energy carried in the first light conducting fiber 1 is given a value 1 and it is assumed that the light energy is uniformly distributed over the entire cross section of the optical fiber 1, the proportions $\eta_2$ and $\eta_{30}$ which are the energy fed into the main light conductor 2 and the strip waveguides 30 are determined by the following two formulas:

$$\eta_2 = \frac{1}{\pi} \left(\frac{\pi a}{180} - \sin \alpha\right)$$

and $$\eta_{30} = \frac{1}{2\pi} \left(\frac{\pi \beta}{180} - \sin \beta\right)$$

The total loss $v_g$ occurring at the coupling point or surface S is thus formed by the following formula:

$$v_g = 1 - (\eta_2 + \eta_{30}).$$

Thus, it is clearly seen that the total loss in the transmitted proportions of the light energy are related to the magnitude of the distance a by which the centers $M_1$ and $M_2$ of the fibers 1 and 2 are offset from each other.

A typical value for the radius of the core of the optical fibers 1 and 2 is $r_K = 45$ μm. A typical value for the thickness of the fiber cladding is $r_M = 5$ μm. In this case, the strip waveguide 30 should advantageously have a height of $2 r_K + r_M$ and thus equal 95 μm. The width of the strip waveguide 30 is approximately the same value.

Figure 3:
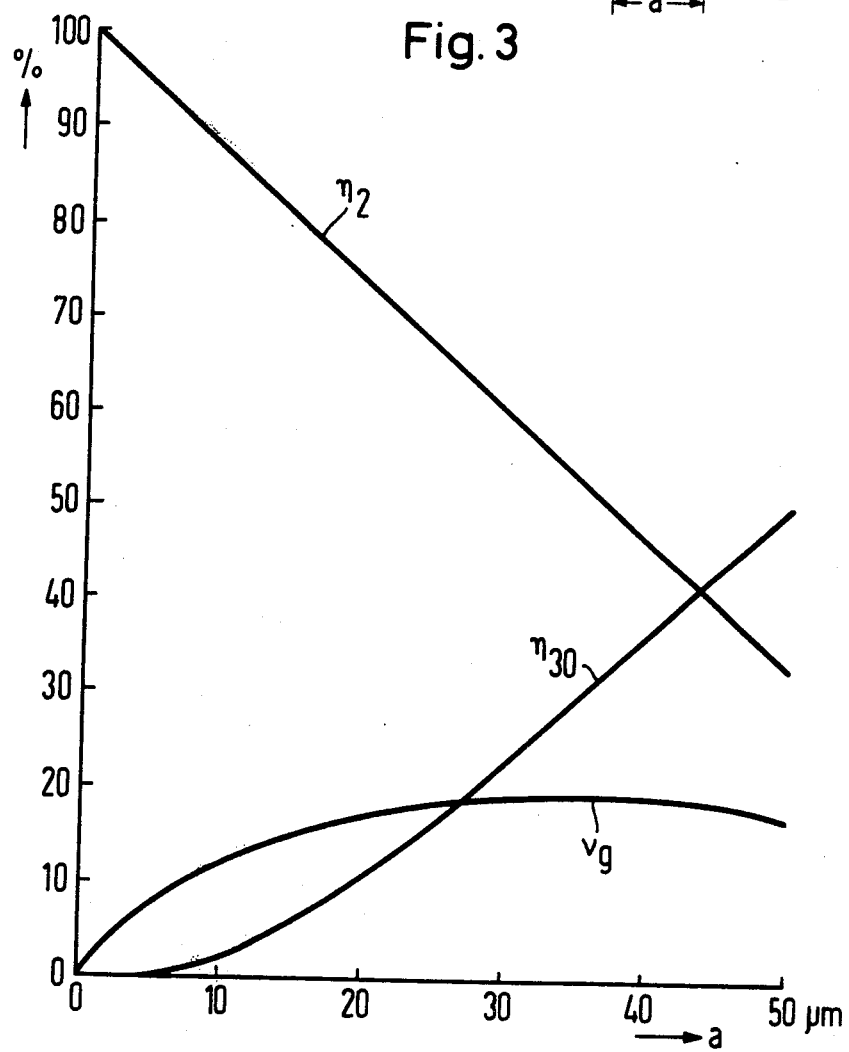
FIG. 3 is a graph showing the proportion and loss in relation to the amount of offset.

In FIG. 3, the proportions to $\eta_2$ and $\eta_{30}$ and the total loss value $v_g$ for dimensions of $r_K = 45$ μm, $r_M = 5$ μm and with a strip waveguide having a substantially square cross section with a height of 100 μm and a width of approximately 100 μm are plotted graphically as a function of the offset distance a, which distance is measured in μm and plotted on the abscissa of the graph. The magnitude for the proportions $\eta_2$ and $\eta_{30}$ and the total loss value $v_g$ are indicated in percent of the light energy carried in the first conductor or optical fiber 1 which has a value of 100%. It can be seen that the theoretical total loss $v_g$ are almost constant over a fairly wide range of values for the offset distance a. With the above named fiber dimensions, the maximum value for the total loss is approximately 19%.

When the light passes from the strip waveguide 30 to the optical fiber 3 with the strip waveguide having the above mentioned square cross section of 100 μm by 100 μm, a loss of approximately 36% occurs. If, for instance, one removes 10% of the light energy carried in the first optical fiber 1 through the strip waveguide 30, this 36% loss means an additional loss of about 3% relative to the light energy carried in the incoming optical fiber 1 during the passage from the strip waveguide 30 to the branch fiber 3. If the cross section of the strip waveguide is chosen to be smaller, this value can be reduced further.

When the strip waveguide 30 has a height which is equal to the sum of the diameter of the fiber core and the thickness of the fiber cladding, the optimum value is achieved. As far as is technically feasible, the width or breath of the strip waveguide should be made as small as possible so as to make the packing factor as large as possible during passage from the strip waveguide 30 to the branch optical fiber 3.

In a test which was made with an embodiment illustrated in FIG. 1, the fibers, which have a core diameter of approximately 90 μm and a cladding thickness of approximately 5 μm and an acceptance angle of approximately ±7°, were connected together. The height and width of the strip waveguide 30 was 100 μm. The distance of offset a was a value of about 15 μm. The proportion $\eta_2$ was about 73% more than 1% was measured for the proportion $\eta_{30}$. The last value is so low because the curvature of the strip waveguide 30 was not matched to the high acceptance angle of the photo conducting fibers so that leakage waveguides occurred.

Figure 4:
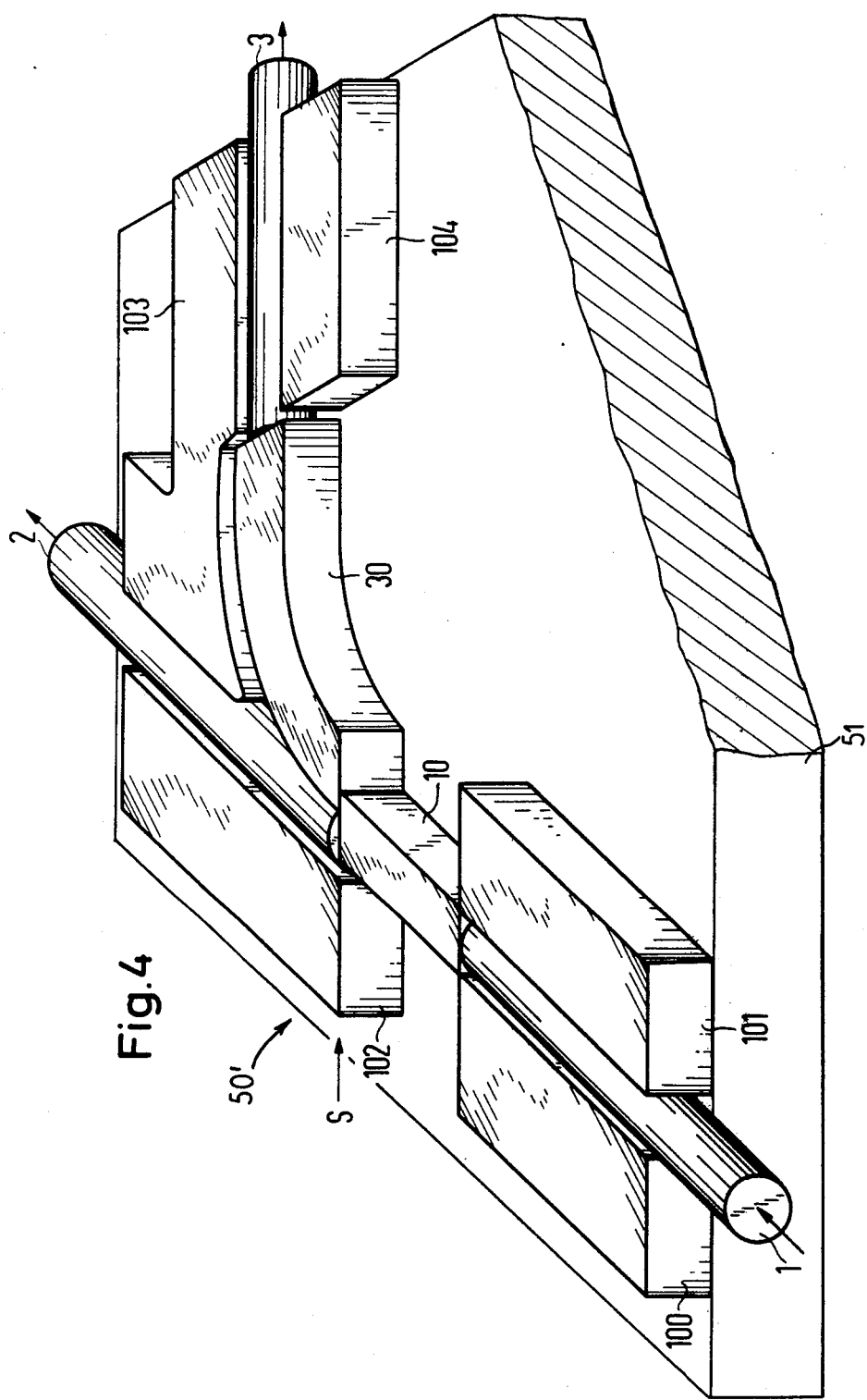
FIG. 4 is a perspective view with portions broken away for purposes of illustration of an embodiment of the present invention.

An embodiment of the coupler is generally indicated at 50' in FIG. 4. The elements of the coupler 50', which are the same as the elements of the coupler 50, are identified by the same element number. It can be seen in the coupler 50', that an additional lamellar or strip waveguide 10 is interposed between the coupling point or surface S and the incoming optical fiber 1. Thus, the first conductor is composed of the fiber and the additional strip waveguide 10.

The efficiency of this embodiment is calculated with reference to FIG. 5. The additional strip waveguide 10 has a square cross section with a width and height d equal to the sum of the diameter of the fiber core and the cladding thickness of the second or main optical fiber 2. The strip waveguide 30 has the same cross-sectional configuration. Two strip waveguides 10 and 30 will overlap each other an amount or breath a which is the amount of offset between the center of the main fiber 2 and the end face of the strip waveguide 10. Due to the amount of offset, the two strip waveguides overlap in an area $f_3$ and the core of the main light conducting fiber 2 and the strip waveguide 10 overlap an area $f_2$. The size of these areas are determined by the following formulas:

$$f_2 = \pi r_K^2 - (\frac{\pi \gamma}{180} - \sin \gamma) \frac{r_K^2}{2}$$

and $$f_3 = a \cdot d$$

The coupling efficiency values are again determined by the magnitudes of these areas. The proportion of the light passing from the additional strip waveguide 10 to the main optical fiber 2 is denoted by $\vartheta_2$, and the proportion of light passed to the strip waveguide 30 is indicated by $\vartheta_{30}$. The value of these proportions are determined by the following two formulas:

$$\vartheta_2 = \frac{(\pi r_K^2 - (\frac{\pi \gamma}{180} - \sin \gamma) \frac{r_K^2}{2})}{d^2}$$

and $$\vartheta_{30} = a \cdot \frac{d}{d^2} = \frac{a}{d}$$

The angle $\gamma$ can be obtained from FIG. 5.
The total loss $v_g$ is again determined by the formula:

$$v_g = 1 - (\vartheta_2 + \vartheta_{30})$$

In FIG. 6 the efficiency values and the total loss are again illustrated graphically in the same manner as in FIG. 3 in relation to the size of the offset distance a. Once again, these values are based on a core radius of 45 μm for the light conducting fibers and a thickness of 5 μm for the fiber cladding. The cross section of the strip waveguides is substantially square with a height of 100 μm and a width of 100 μm.

From a comparison of FIGS. 3 and 6, it can be seen that the total loss for a small offset distance a is much greater in the second embodiment of the coupler 50' than with the first coupler 50. For larger offset distances, for example when a is more than 30 μm, the theoretical total losses for both embodiments are about the same. However, for the same total loss different proportions are passed over to the fibers 2 and 3.

As described hereinabove, each of the couplers 50 and 50' are used as output couplers. If the couplers are to be used as input couplers, then the arrow symbolizing the direction of propogation of the light are reversed in each embodiment. If the light conducting fibers 1, 2 and 3 are identical in form, generally higher losses occur when the couplers are used as input couplers than when the couplers are used as output couplers. In effect, when the mode spectrum is completely filled in each of the identical light conducting fibers 1, 2 and 3, the input function means passing from a system with a high mode number to a system with a lower mode number and such a transition will involve losses.

Basically, these additional losses can only be avoided when the number of possible modes in the light conducting fiber 1 is not less than the sum of the modes in the light conducting fibers 2 and 3. With identical light conducting fibers, this means that the mode spectrum in the fibers 2 and 3 must not be completely filled so that the sum of the modes of these two fibers is at the most equal to the maximum number of modes in the optical or light conducting fiber 1.

When using light conducting fibers that are not identical, it is possible to give the light conducting fiber 1 a larger core cross section so that this light conducting fiber can present a higher mode number. In this When using light conducting fibers that are not identical, it is possible to give the light conducting fiber 1 a larger core cross section so that this light conducting fiber can present a higher mode number. In this case, loss-free imput coupling is possible even with the light conducting fibers 2 and 3 filled if the light conducting fiber 1 can carry a corresponding maximum number of modes.

In the case of light conducting fibers that are not identical, the embodiment of the coupler 50' shown in FIG. 4 is advantageous because the strip waveguides 10 and 30 can be easily made as tapers. Because of the transforming properties of tapers, such as the reduction of the waveguiding cross section with simultaneous enlargement of the mode angles, the different cross sections of the light conducting fibers can be better matched so that losses during input coupling are reduced.

If an identical arrangement as the strip waveguide 30 and the fiber 3 is added to that coupling face of fiber 2 which is still uncovered the tapping element of FIG. 1 and FIG. 4 is completed to an out- and in-coupling element. Because of reciprocity the coupling in factor of the couple in FIG. 4 is the same as the coupling out factor (moves from fiber 1 to fiber 3) and is about the same with the couple in FIG. 4.

The embodiment shown in FIGS. 1 and 4 can be made photolithographically in the following manner. A light sensitive synthetic film which may be a layer or a light sensitive synthetic foil, for example a photosensitive foil sold under the tradename RISTON by DuPont Chemical Company, is applied on the surface of the substrate. The film is then exposed through a mask which has a desired structure for both the guide members or pieces 100–104 and the strip waveguides such as 10 and 30. After exposure and development, only the guide members 100–104 will remain on the substrate together with the strip waveguides 10 and 30. Advantageously, the strip waveguides and the guide pieces or members can thus be made in one operation from the same material with the other portions of the fim or photosensitive layer being dissolved during the developing process.

After forming the guide members and the strip waveguides on the substrate, the only remaining step is applying the light conducting fibers 1, 2 and 3 in their desired positions in the trenches formed by the guide pieces or members 100–104. The above mentioned light sensitive plastic film or foils are flexible so that if the width of the trench is slightly less than the diameter of the light conducting fiber, the light conducting fibers can be fixed in the trenches with a gentle pressure. After insertion of the fibers in the trenches, an adhesive can be applied and a cover may be fitted to protect the fibers. Once the adhesive is set, the fibers are definitely fixed in their position. A thermoplastic film can also be used in place of the adhesive so that the cover can be connected to the light sensitive plastic film by heating the thermoplastic film.

Virtually any mechanically strong material with an optically smooth surface can be used as the substrate. These materials only need to have a refractive index, which is in tune with the acceptance angle of the light conducting fibers and is smaller than the refractive index of the strip waveguides 10 and 30.

Although various minor modifications may be suggested by those versed in the art, it should be understood that I wish to embody within the scope of the patent warranted hereon, all such modifications as reasonably and properly come within the scope of my contribution to the art.

I claim:

1. A coupler for use with multi-mode light conducting fibers to couple-out and couple-in a light signal to the fibers comprising a substrate, a first light conductor being disposed on the substrate and having an end face forming a coupling surface, a main light conducting fiber being disposed on the substrate with its end face at the coupling surface and the center of the end face being offset by a distance a from the center of the coupling surface, a strip waveguide being disposed on the substrate and having a face in contact with a portion of the coupling surface of the first light conductor, said strip waveguide extending to a branch light conducting fiber so that a portion of a signal entering the coupler in the first light conductor is applied to both the main and branch light conducting fibers and signals entering the coupler in the branch and main light conducting fibers are applied to the first light conductor.

2. A coupler according to claim 1, wherein the substrate has means for positioning each of the light conducting fibers in the desired position thereon.

3. A coupler according to claim 2, wherein said means for positioning comprises portions of material disposed on said substrate, said material of said portion being the same as the material forming the strip waveguide.

4. A coupler according to claim 1, wherein each light conducting fiber has a core with a cladding and wherein the strip waveguide has a rectangular cross section with a height of the waveguide being equal to the sum of the core diameter and cladding thickness of the light conducting fibers.

5. A coupler according to claim 1, wherein the first light conductor is a light conducting fiber.

6. A coupler according to claim 5, wherein each of the light conducting fibers are positioned on the substrate by guide means.

7. A coupler according to claim 6, wherein the guide means comprise guide grooves in a layer disposed on the substrate, said layer being of the same material as the material of the strip waveguide.

8. A coupler according to claim 1, wherein the first light conductor comprises an additional strip waveguide being disposed on the substrate and having one end forming the coupling surface, said additional strip waveguide being coupled at an opposite end to a light conducting fiber.

9. A coupler according to claim 8, wherein each of the light conducting fibers are positioned on the substrate by guide means comprising grooves in a layer disposed on the substrate.

10. A method for producing a coupler for use with multi-mode light conducting fibers to couple-out and couple-in the light signals to the fibers, said coupler comprising a substrate, a first light conductor being disposed on the substrate and having an end face forming a coupling surface, a main light conducting fiber having an end face, a strip waveguide being disposed on the substrate and having a face in contact with a portion of the coupling surface of the first light conductor, said strip waveguide extending to a branch light conducting fiber, and guide means comprising grooves in a layer disposed on the substrate for positioning the main light conducting fiber with its end face at the coupling surface and the center of the end face being offset a distance a from the center of the coupling surface and positioning the branch light conducting fiber for coupling to the strip waveguide, said method comprising providing a light sensitive film on the substrate, said film having a thickness which is roughly equal to the diameter of the light conducting fibers, providing a mask corresponding to the configuration of the strip waveguide and the guide means, exposing the light sensitive film through said mask, developing the film to form the strip waveguide and guide means, and then positioning the main and branch light conducting fibers in their respective guide means to complete the coupler.

* * * * *